United States Patent
Kim et al.

(10) Patent No.: US 8,323,848 B2
(45) Date of Patent: Dec. 4, 2012

(54) MEMBRANE-ELECTRODE ASSEMBLY FOR FUEL CELL, PREPARATION METHOD, AND FUEL CELL COMPRISING THE SAME

(75) Inventors: Hee-Tak Kim, Suwon-si (KR); Hyoung-Juhn Kim, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1007 days.

(21) Appl. No.: 11/140,356

(22) Filed: May 26, 2005

(65) Prior Publication Data

US 2005/0271921 A1 Dec. 8, 2005

(30) Foreign Application Priority Data

Jun. 7, 2004 (KR) ................ 10-2004-0041328

(51) Int. Cl.
*H01M 8/10* (2006.01)
*B05D 5/12* (2006.01)
(52) U.S. Cl. ............. 429/491; 429/479; 427/115
(58) Field of Classification Search ........... 429/479–491
See application file for complete search history.

(56) References Cited

U.S. PATENT DOCUMENTS

| | | | |
|---|---|---|---|
| 5,561,000 A | 10/1996 | Dirven et al. | |
| 6,746,793 B1 | 6/2004 | Gyoten et al. | |
| 2002/0001744 A1* | 1/2002 | Tsusaka et al. | 429/42 |
| 2003/0003474 A1* | 1/2003 | Tanner et al. | 435/6 |
| 2003/0198860 A1* | 10/2003 | Yasumoto et al. | 429/43 |
| 2005/0266150 A1* | 12/2005 | Yong et al. | 427/58 |
| 2006/0154057 A1* | 7/2006 | Nonninger | 428/364 |

FOREIGN PATENT DOCUMENTS

| | | | |
|---|---|---|---|
| CN | 1305647 A | | 7/2001 |
| JP | 2000-106200 A | | 4/2000 |
| JP | 2000-106202 A | | 4/2000 |
| JP | 2002-203575 A | | 7/2002 |
| JP | 2002-289206 A | | 10/2002 |
| JP | 2003-115302 A | | 4/2003 |
| JP | 2003-288915 | | 10/2003 |
| JP | 2003288915 A | * | 10/2003 |
| KR | 2001-0092654 | | 10/2001 |

OTHER PUBLICATIONS

SIPO Office action dated Feb. 22, 2011, for corresponding Chinese Patent application 200810144872.X, with English translation, noting references previously filed Aug. 13, 2008 and Mar. 29, 2007.
Shen Chunhui et al., "Research on perfluorosulfonic acid composite proton exchange membrane for fuel cell", New Chemical Materials, Aug. 2002, vol. 30 No. 8; 10-12.
English abstract for EP 1096587, which corresponds to CN 1305647 listed above.
Patent Abstracts of Japan for Publication No. 2003-288915; Date of publication of application Oct. 10, 2003, in the name of Eiji Endo et al.
Korean Patent Abstracts for Publication No. 1020010092654; Date of publication of application Oct. 26, 2001, in the name of Hyeok Jang.

* cited by examiner

*Primary Examiner* — Karie O'Neill Apicella
(74) *Attorney, Agent, or Firm* — Christie, Parker & Hale, LLP

(57) ABSTRACT

A membrane-electrode assembly for a fuel cell of the present invention includes a polymer electrolyte membrane with a layer of inorganic fine particles on either side. Catalyst layers are positioned on the layers of inorganic fine particles with gas diffusion layers positioned on the catalyst layers. The resulting polymer electrolyte membrane provides improved cell efficiency.

14 Claims, 3 Drawing Sheets

MEMBRANE-ELECTRODE ASSEMBLY FOR FUEL CELL, PREPARATION METHOD, AND FUEL CELL COMPRISING THE SAME

CROSS REFERENCE TO RELATED APPLICATION

This application claims the benefit of and priority to Korean Patent Application No. 10-2004-0041328 filed on Jun. 7, 2004 in the Korean Intellectual Property Office, the entire disclosure of which is incorporated herein by reference.

FIELD OF THE INVENTION

The present invention relates to a membrane-electrode assembly for a fuel cell, a fabrication method, and a fuel cell comprising the same. More particularly, it relates to a membrane-electrode assembly for a fuel cell that can easily form a three-phase surface by supplying protons, water, and air smoothly, and thus improves the operation performance of the fuel cell.

BACKGROUND OF THE INVENTION

A fuel cell is a power generation system that converts chemical energy, obtained from a reaction between oxygen and hydrogen from a hydrocarbon-based material, such as methanol, ethanol, or natural gas, to electrical energy.

A fuel cell can be classified into a phosphoric acid type, a molten carbonate type, a solid oxide type, a polymer electrolyte type, or an alkaline type of fuel cell depending upon the kind of electrolyte used. Although each fuel cell basically operates in accordance with the same basic principles, the kind of fuel, the operating temperature, the catalyst, and the electrolyte may be selected based on the type of cells.

Recently, polymer electrolyte membrane fuel cells (PEMFC) have been developed with superior power characteristics compared to conventional fuel cells, lower operating temperatures, and faster starting and response characteristics. Such technology has advantages in that it can be applied to a wide array of fields such as transportable electrical sources for automobiles, distributed power sources for houses and public buildings, and small electrical sources for electronic devices.

The polymer electrolyte fuel cell is essentially composed of a stack, a reformer, a fuel tank, and a fuel pump. The stack forms a body, and the fuel pump provides fuel stored in the fuel tank to the reformer. The reformer reforms the fuel to generate hydrogen gas and supplies the hydrogen gas to the stack. The hydrogen gas is electrochemically reacted with oxygen in the stack to generate electrical energy.

The fuel cell may also be a direct methanol fuel cell (DMFC) type in which liquid methanol fuel is directly introduced to the stack. The direct methanol fuel cell can omit the reformer which is essential for a polymer electrolyte fuel cell.

According to the above-mentioned fuel cell system, the stack substantially generating the electricity has a structure in which several or several tens of unit cells, each consisting of a membrane electrode assembly (MEA) and a separator (referred to as a "bipolar plate") are laminated together. The membrane electrode assembly is composed of an anode (referred to as "fuel electrode" or "oxidation electrode") and a cathode (referred to as "air electrode" or "reduction electrode") separated by a polymer electrolyte membrane.

A conventional membrane-electrode assembly has a structure where a high-density polymer electrolyte membrane directly contacts the catalyst layers. The catalyst layers are formed by being coated on the polymer electrolyte membrane directly, or by being coated on a microporous layer formed on one side of a gas diffusion layer (GDL).

However, when the catalyst layer of the membrane-electrode assembly is formed very thin through an evaporation method, and laminated to a high-density polymer electrolyte membrane, the catalyst layer may be surrounded by the high-density polymer electrolyte membrane causing a problem from increased diffusion paths during the gas transfer. Consequently, there may be problems in that the gas transfer rate is low and that the water generated at the cathode clogs the pores in the gas diffusion layer.

SUMMARY OF THE INVENTION

In one embodiment of the present invention, a membrane-electrode assembly for a fuel cell is provided that can improve the fuel cell efficiency by supplying protons, water, and air smoothly, and forming a three-phase surface effectively, a fabrication method thereof, and a fuel cell having the same.

In another embodiment of the present invention, a membrane-electrode assembly for a fuel cell is provided that includes a polymer electrolyte membrane with porous proton transfer layers which contain inorganic fine particles on the sides of the polymer electrolyte membrane. Catalyst layers are positioned on both sides of the porous proton transfer layers of the polymer electrolyte membrane and gas diffusion layers (GDL) are positioned on the sides of the catalyst layers.

In yet another embodiment of the present invention, a method for fabricating a membrane-electrode assembly for a fuel cell is provided which includes the steps of: a) coating both sides of a polymer electrolyte membrane with inorganic fine particles; b) forming catalyst layers on one side of the gas diffusion layers which are formed of a conductive substance; and c) adhering the gas diffusion layers coated with the catalyst layers to both sides of the polymer electrolyte membrane coated with the inorganic fine particles.

In still another embodiment of the present invention, a method for fabricating a membrane-electrode assembly for a fuel cell is provided which includes the steps of: a) forming catalyst layers on one side of each gas diffusion layer which is formed of a conductive substance; b) coating one side of the gas diffusion layers, having the catalyst layers formed thereon, with inorganic fine particles; and c) adhering the gas diffusion layers coated with the inorganic fine particles to both sides of the polymer electrolyte membrane by having the inorganic fine particles contact the polymer electrolyte membrane.

In another embodiment of the present invention, a method for fabricating a membrane-electrode assembly for a fuel cell is provided which includes the steps of: a) coating both sides of a polymer electrolyte membrane with inorganic fine particles; b) forming catalyst layers on the inorganic fine particles of the polymer electrolyte membrane; and c) adhering gas diffusion layers to the catalyst layers of the polymer electrolyte membrane.

In another embodiment of the present invention, a fuel cell system is provided which includes at least one electricity generating unit including a membrane-electrode assembly having porous proton transfer layers that include a polymer electrolyte membrane. Catalyst layers are positioned on both sides of the polymer electrolyte membrane, and gas diffusion layers that contain inorganic fine particles are positioned on the side of each catalyst layer which does not contact the polymer electrolyte membrane. The electricity generating unit generates electricity through an electrochemical reaction of hydrogen and oxygen. The fuel cell system further includes a fuel supplying unit for supplying hydrogen to the electricity generating unit, and an oxygen supplying unit for supplying oxygen to the electricity generating unit.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION

In the following detailed description, the following embodiments of the invention have been shown and described, simply by way of illustration. As will be realized, the invention is capable of modification in various respects, all without departing from the invention. Accordingly, the drawings and description are to be regarded as illustrative in nature, and not restrictive.

The present invention relates to a membrane-electrode assembly forming a three-phase surface that can transfer gas, protons, and electrons easily, and a method for fabricating the membrane-electrode assembly.

The membrane-electrode assembly of the present invention includes porous proton transfer layers between a polymer electrolyte membrane and catalyst layers. The porous proton transfer layers contain inorganic fine particles that can improve transfer of gas, protons, and electrons.

Figure 1:
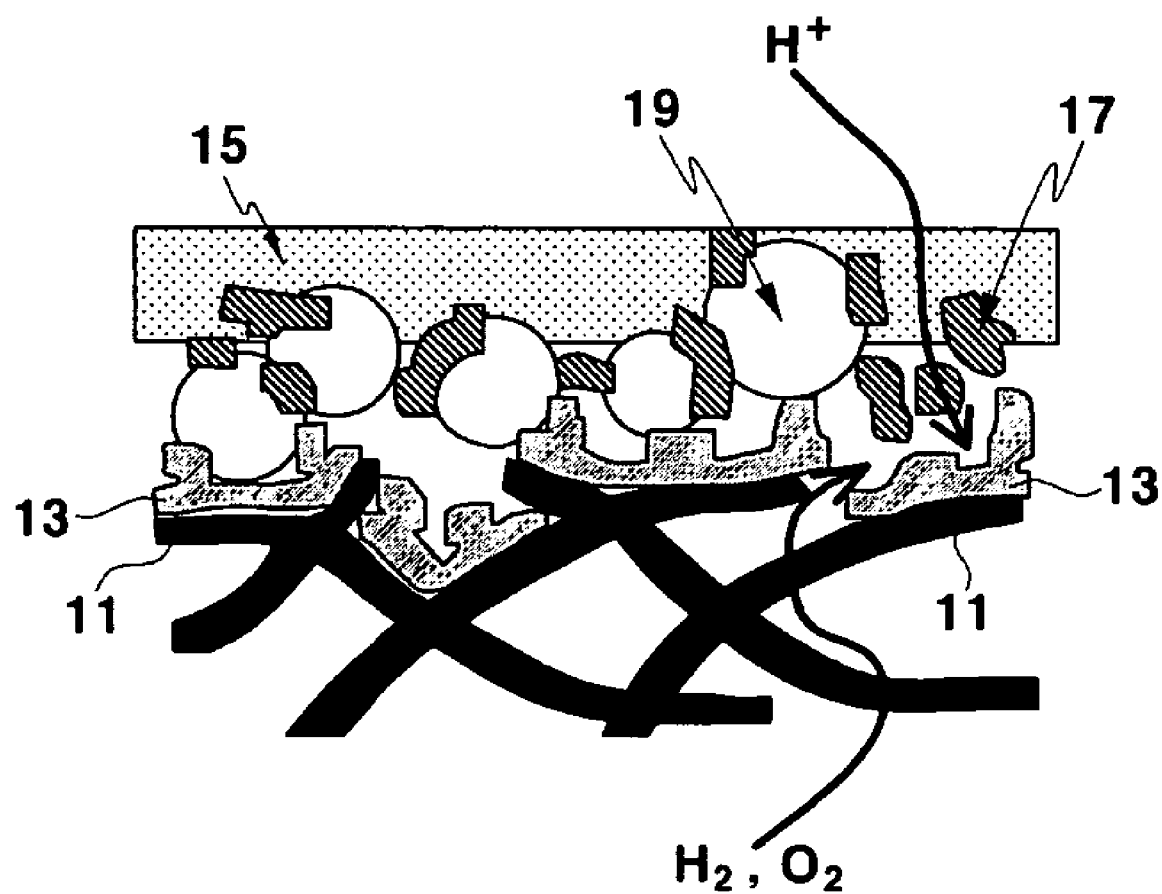
FIG. 1 is a diagram describing a membrane-electrode assembly including a polymer electrolyte membrane according to the present invention.

As shown in FIG. 1, the membrane-electrode assembly of the present invention comprises a polymer electrolyte membrane 15, catalyst layers 13 positioned on both sides of the polymer electrolyte membrane 15, and gas diffusion layers (GDL) 11 positioned on the catalyst layers 13 opposite the polymer electrolyte membrane 15. The membrane-electrode assembly further comprises porous proton transfer layers which contain inorganic fine particles 19 between the polymer electrolyte membrane 15 and the catalyst layers 13. The gas diffusion layers 11 are made of a conductive material. According to this embodiment, the inorganic fine particles 19 are carried by a polymer binder 17.

The inorganic fine particles 19 between the polymer electrolyte membrane 15 and the catalyst layers 13 exist as a porous proton transfer layer. Since the porous proton transfer layer forms a path for transferring protons and gas through the pores, it is effective to form a three-phase surface. In other words, the porous proton transfer layer diffuses gas from the gas diffusion layers 11 toward the catalyst layers 13 and also diffuses gas from the polymer electrolyte membrane 15 toward the catalyst layers 13. In addition, since the porous proton transfer layer is coated with a hydrophilic substance, excess water generated at the cathode does not clog the pores of the gas diffusion layers 11 and transfers to the porous proton transfer layer containing the inorganic fine particles 19. Thus, polarization caused by water clogging can be avoided.

In one embodiment of the invention, the inorganic fine particles 19 preferably contain a non-ion conductive inorganic substance or a proton transferring inorganic substance. For such an embodiment, the non-ion conductive inorganic substance may be selected from the group consisting of $SiO_2$, $Al_2O_3$, $TiO_2$, $BaTiO_2$, $Ba_2O_3$ and combinations thereof. In another embodiment of the invention, the proton transferring inorganic substance may be selected from the group consisting of $ZrO_2$, ZrP, $H_3PO_4$, silicotungstic acid, phosphotungstic acid, phosphomolybdic acid and combinations thereof. In certain embodiments of the invention, the preferred size of the inorganic fine particles is between 0.1 μm and 10 μm. A size of less than 0.1 μm does not create sufficient porosity to transfer gas and is also too small to transfer gas. Whereas, a size of more than 10 μm makes to the porous proton transfer layer too thick, resulting in difficulty of the proton transfer.

In certain embodiments, the preferred porosity of the porous proton transfer layer is in the range of 10 to 70%. Porosity less than 10% prevents gas diffusion to the catalyst layer, and porosity of more than 70% decreases the ionic conductivity of the proton transfer layer.

Any kind of polymer can be used as the polymer electrolyte membrane 15 as long as the polymer has proton conductivity. In one embodiment, preferred polymers include fluorine-based polymers, benzimidazol-based polymers, ketone-based polymers, polyether-based polymers, polyester-based polymers, polyamide-based polymers, and polyimide-based polymers. To be more specific, the polymer may include poly(perfluorosulfonic acid), poly(perfluorocarboxylic acid), a copolymer of fluorovinylether and tetrafluoroethylene that includes a sulfonic acid group, defluorinated polyetherketone sulfide, arylketone, and a polybenzimidazol such as poly(2,2'-(m-phenylene)-5,5'-bibenzimidazol), or poly(2,5-benzimidazol). However, such polymers are merely exemplary and the invention is not intended to be limited to such examples. In certain embodiments, the polymer electrolyte membrane has a thickness of between 10 and 200 μm.

The catalyst layers 13 include a metal catalyst, which helps the oxidation of the hydrogen and the reduction of the oxygen. In one embodiment, preferred metal catalysts include platinum, the platinum group metals of the periodic table, ruthenium, and combinations or alloys thereof.

According to a first method for fabricating the membrane-electrode assembly of the present invention, the membrane-electrode assembly is fabricated by coating both sides of the polymer electrolyte membrane 15 with a slurry which contains inorganic fine particles. One side of each of the gas diffusion layers is coated with a catalyst layer and the gas diffusion layers coated with the catalyst layers are laminated on either side of the polymer electrolyte membrane with the catalyst layers toward the polymer electrolyte membrane 15. Hereafter, the process at each step will be described in detail.

The porous proton transfer layers containing inorganic fine particles are formed of the inorganic fine particles 19 by mixing a proton conductive binder with a solvent to thereby prepare a slurry. The slurry is coated on the polymer electrolyte membrane 15 and the solvent is removed.

The proton conductive binder contains an electrolyte component that forms a path for transferring protons. In one embodiment, it preferably comprises a polymer including an ion function attached to a polymer chain or including an acid. The proton conductive binder may be a polymer selected from the group consisting of poly(perfluorosulfonic acid), poly(perfluorocarboxylic acid), a copolymer of tetrafluoroethylene and fluorovinylether that has a sulfonic acid, defluorinated polyetherketone sulfide, arylketone, poly(2,2'-(m-phenylene)-5,5'-bibenzimidazol), and poly(2,5-benzimidazol).

For the solvent, an alcohol-based solvent, an ether-based solvent, an ester-based solvent, or an amide-based solvent can be used. It is preferable that the inorganic fine particles and the proton conductive binder are used in the weight ratio of 1:5 to 50:1. If the weight ratio is more than 1:5, the porosity and the pore size are reduced so that it is difficult to facilitate gas diffusion to the catalyst layer. Whereas, if the weight ration is less than 50:1, the proton conductivity of the porous proton transfer layer decreases.

For the coating process, a coating method using a doctor blade, a spin coating method, a spray coating method, a gravure coating method, a deep coating method, a silk screening method, or a painting method may be used according to the viscosity of the composition. However, the present invention is not limited to these coating methods.

In the present invention, the catalyst layers are formed on the gas diffusion layers. Herein, it is preferable that the catalyst layers are formed by performing dry coating using an evaporation method. The use of the dry coating makes the metal catalyst exist only on the surface of the polymer electrolyte membrane 15 to thereby reduce the quantity of the used catalyst and shortens the transfer path of protons to the catalyst layers to thereby increase a reaction rate, and forms a uniform thin film.

Examples of the evaporation method are chemical vapor deposition methods including plasma chemical vapor deposition and laser chemical vapor deposition, sputtering, electron beam evaporation, vacuum thermal evaporation, laser ablation, thermal evaporation, and physical vapor deposition. However, the present invention is not limited to the above-mentioned evaporation methods.

The gas diffusion layers are formed of a conductive material, such as carbon paper or carbon cloth, or polytetrafluoroethylene (PTFE) after water repellent treatment thereon. The gas diffusion layers support the polymer electrolyte membrane-electrode assembly and diffuse a reaction gas on the polymer electrolyte membrane-electrode assembly.

According to a first method, the membrane-electrode assembly suggested in the present invention is fabricated by laminating the polymer electrolyte membrane having the porous proton transfer layers to the gas diffusion layers coated with the catalyst layer.

The polymer electrolyte membrane and the gas diffusion layers are adhered to each other by laminating the polymer electrolyte membrane coated with the porous proton transfer layers to the gas diffusion layers having the catalyst layer formed thereon and then applying heat or pressure thereto. It is also possible to laminate the polymer electrolyte membrane with the gas diffusion layers by applying pressure at room temperature before the volatilization of the solvent in the slurry.

According to a second method of forming the membrane-electrode assembly, the membrane-electrode assembly is fabricated by coating one side of each of the gas diffusion layers with a catalyst layer; coating the gas diffusion layers having the catalyst layers with the slurry containing the inorganic fine particles; and laminating the gas diffusion layers to both sides of the polymer electrolyte membrane with the inorganic fine particles contacting the polymer electrolyte membrane.

The porous proton transfer layers are formed on the inorganic fine particles by mixing a proton conductive binder with a solvent to thereby prepare slurry, coating the gas diffusion layers having the catalyst layers with the slurry, and removing the solvent.

The proton transfer binder and solvent are the same as used in the previous method. Also, the coating process is performed by the same method as previously disclosed and the catalyst layers are formed on the gas diffusion layers by the same evaporation method.

In the present invention, the membrane-electrode assembly is fabricated by adhering the gas diffusion layers coated with the catalyst layers including the porous proton transfer layer to the polymer electrolyte membrane.

According to a third method of forming the membrane-electrode assembly, the membrane-electrode assembly is fabricated by coating both sides of the polymer electrolyte membrane with the inorganic fine particles; forming the catalyst layers on either side of the polymer electrolyte membrane after it has been coated with the inorganic fine particles; and laminating the gas diffusion layers on both sides of the polymer electrolyte membrane with the catalyst layers formed thereon.

The porous proton transfer layer is formed on the inorganic fine particles by mixing a proton conductive binder with a solvent to thereby prepare a slurry, coating the polymer electrolyte membrane with the slurry, and removing the solvent.

The proton transfer binder and solvent are the same as used in the previous methods as is the coating process. The catalyst layers are formed on the polymer electrolyte membrane having the porous proton transfer layers by the same evaporation method set forth above.

In the present invention, the membrane-electrode assembly is fabricated by laminating the gas diffusion layers with the polymer electrolyte membrane coated with the catalyst layers including the porous proton transfer layer.

In the first to third methods, the gas diffusion layers are adhered to the polymer electrolyte membrane by laminating the polymer electrolyte membrane with the gas diffusion layers and the catalyst layers to the porous proton transfer layer, and applying heat or pressure thereto. Also, it is possible to adhere the two by applying pressure at room temperature before the volatilization of the solvent in the slurry.

In the present invention, it is possible to form a microporous layer between the catalyst layer and the gas diffusion layer. The microporous layer can be formed by coating the gas diffusion layer with a conductive powder. Also, the microporous layer can be formed in the catalyst layers and then laminated with the gas diffusion layers. The microporous layer can include a conductive powder having a small particle diameter, such as carbon powder, carbon black, acetylene black, activated carbon, carbon fiber, or carbon nanotube.

The microporous layer is prepared by coating a conductive substrate or the catalyst layers with a composition including the conductive powder, a fluorine-based binder resin, and a solvent. As for the fluorine-based binder resin, it is preferable to use polytetrafluoroethylene (PTFE) or polyvinylidene fluoride. As for the solvent, it is preferable to use an alcohol, such as isopropyl alcohol, n-butyl alcohol, or n-propyl alcohol, water, dimethyl sulfoxide (DMSO), dimethylacetamide (DMAc), or N-methylpyrrolidone (NMP). The coating can be performed by using a screen printing method, a spray coating method, or a coating method using a doctor blade according to the viscosity of the composition. However, the present invention is not limited to the above-mentioned coating methods.

A fuel cell can be fabricated by inserting the above-prepared membrane-electrode assembly between separators (also referred to as bipolar plates) having a gas flow channel and a cooling channel, and stacking more than one unit cell to thereby fabricate a stack, and by inserting the stack between two end plates. The fuel cell is fabricated by using conventional technologies widely known to those skilled in the art.

The membrane-electrode assembly of the present invention can be applied to a low-temperature humidifying cell, a low-temperature non-humidifying cell, or a high-temperature humidifying cell.

The unit cell forms an electricity generating unit. The fuel cell system of the present invention includes the electricity generating unit, a fuel supplying unit for supplying hydrogen to the electricity generating unit, and an oxygen supplying unit for supplying oxygen to the electricity generating unit.

The electricity generating unit generates electricity through an electrochemical reaction between hydrogen and oxygen. The fuel supplying unit supplies fuel containing hydrogen to the electricity generating unit, while the oxygen supplying unit supplies oxygen to the electricity generating unit.

Hereafter, the operation of the fuel cell will be described briefly. Electricity is generated through the electrochemical reaction between the anode and the cathode by supplying hydrogen or fuel to the anode, and oxygen to the cathode. Herein, an oxidation reaction of the hydrogen or organic fuel occurs at the anode, and a reduction reaction of the oxygen occurs at the cathode. Consequently, a voltage difference is caused between the two electrodes.

Figure 2:
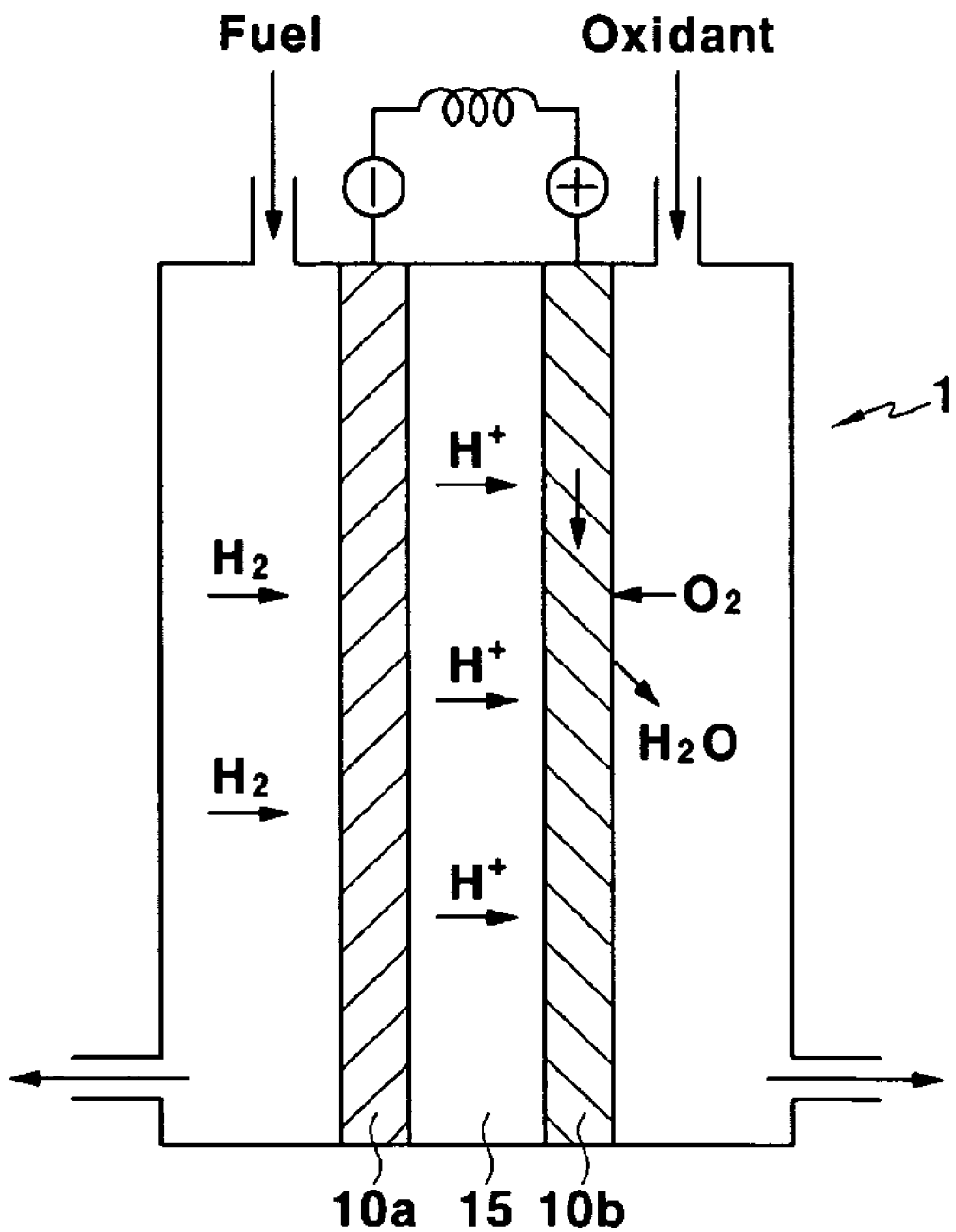
FIG. 2 is a schematic diagram illustrating the operation of a fuel cell including a polymer electrolyte membrane according to the present invention.

FIG. 2 is a schematic diagram showing the operation of a fuel cell 1. A membrane-electrode assembly 20 of the fuel cell 1 comprises an anode catalyst layer 10a, a cathode catalyst layer 10b, and a polymer electrolyte membrane 15. Referring to FIG. 1, if fuel is supplied to the anode catalyst layer 10a, an electrochemical oxidation reaction occurs. In the oxidation reaction, fuel is oxidized by being ionized into a proton $H^+$ and an electron $e^-$. The ionized protons transfer to the cathode catalyst layer 10b through the polymer electrolyte membrane 15, and the electron transfers to the anode catalyst layer 10a. At the cathode catalyst layer 10b, the transferred protons cause an electrochemical reduction reaction with the oxidant such as oxygen supplied to the cathode catalyst layer 10b to generate reaction heat and water, and the transfer of the electrons generates electric energy. The electrochemical energy can be expressed by the following reaction formula.

At the anode: $H_2 \rightarrow 2H^+ + 2e^-$ 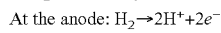

At the cathode: $2H^+ + \frac{1}{2}O_2 + \rightarrow H_2O$ 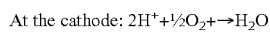

The following examples further illustrate the present invention in detail but they are not to be construed to limit the scope thereof.

EXAMPLE 1

Figure 3:
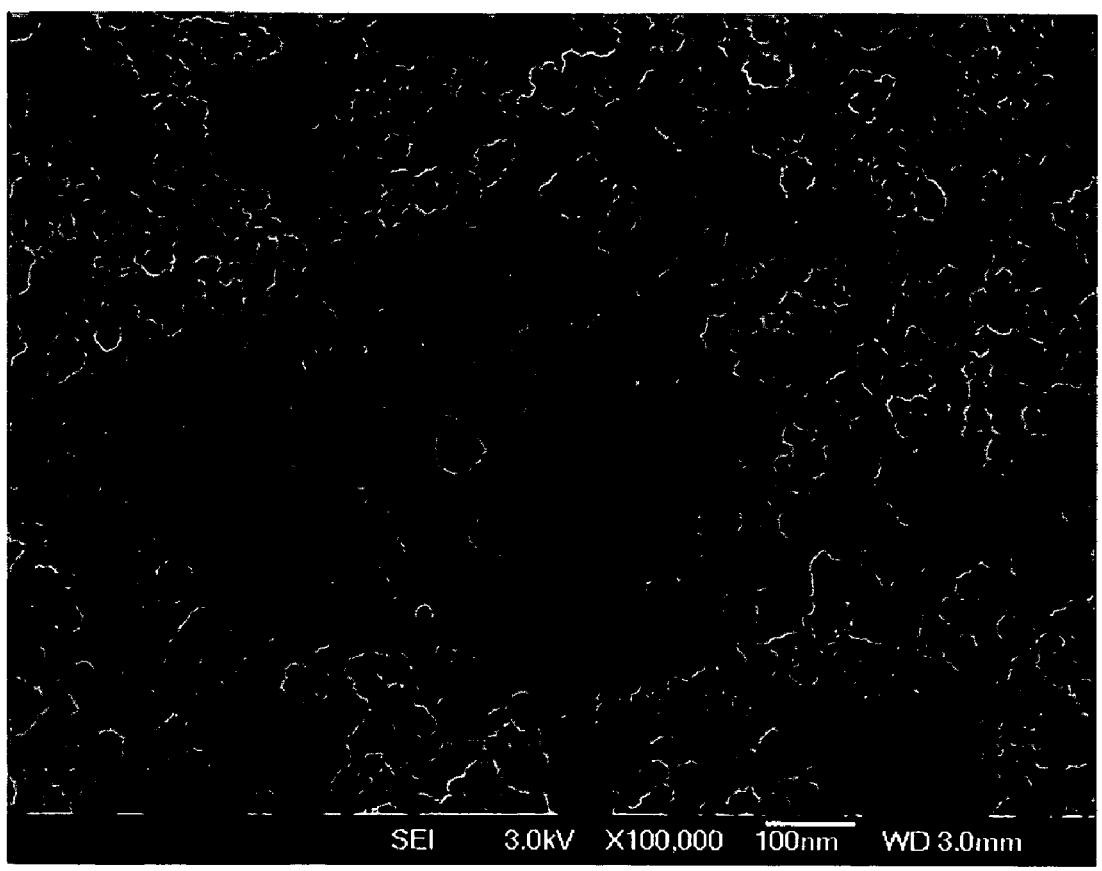
FIG. 3 is a scanning electron microscopic (SEM) photograph for a polymer electrolyte membrane coated with a porous proton-ion membrane in accordance with an embodiment of the present invention.

A membrane-electrode assembly and a unit cell were fabricated. A slurry containing inorganic fine particles was prepared by mixing 0.03 μm of silica, Nafion™ resin (poly(perfluorosulfonic acid)), and a solvent comprising water and isopropyl alcohol in a ratio of 4:1. The silica and the Nafion™ resin were mixed in the weight ratio of 7:3. A porous proton transfer layer was formed by coating the Nafion™ 112 polymer electrolyte membrane with the slurry and removing the solvent. The surface structure of the porous proton transfer layers, as seen through a scanning electron microscopic (SEM), is presented in FIG. 3. Subsequently, catalyst layers were formed by coating water-repellent carbon paper with platinum.

A membrane-electrode assembly was fabricated by depositing the carbon paper with platinum on both sides of the above-prepared polymer electrolyte membrane and applying pressure thereto.

The membrane-electrode assembly was inserted between two pieces of gasket and then the membrane-electrode assembly in the gasket was inserted between two separators having predetermined shapes for a gas flow channel and a cooling channel. The membrane-electrode assembly in the separators was compressed to thereby fabricate a unit cell.

The membrane-electrode assembly formed as above showed performance of 0.4V and 3.1 A/cm² at 60° C. in the ambient of $H_2$/air. On the other hand, when the porous proton transfer layers were not formed, the performance was 0.4V and 2.3 A/Cm².

EXAMPLE 2

The same process as Example 1 was performed, except that the membrane-electrode assembly was fabricated by coating carbon paper having a catalyst layer formed thereon with the slurry containing inorganic fine particles as described in Example 1, laminating the resultant coated carbon paper with a polymer electrolyte membrane, applying pressure thereto at room temperature, and removing the solvent by heating at 120° C.

EXAMPLE 3

The same process as Example 1 was performed, except that the membrane-electrode assembly was fabricated by coating the polymer electrolyte membrane with the slurry containing inorganic fine particles of Example 1 and forming a coating layer thereon, and laminating the resultant coated polymer electrolyte membrane with a carbon paper membrane, applying pressure thereto at room temperature, and removing the solvent by heating at 120° C.

EXAMPLE 4

The same process as in Example 1 was performed, except that ZrP of 0.1 μm was used as the inorganic fine particles.

EXAMPLE 5

The same process as in Example 1 was performed, except that a microporous layer was further formed between the catalyst layer and the carbon paper. The microporous layer was formed by coating carbon paper with a composition including carbon powders and polytetrafluoroethylene (PTFE) in a weight ratio of 8:2 in alcohol. The carbon paper was used after water repellent treatment with polytetrafluoroethylene (PTFE).

As described above, the technology of the present invention supplies protons, water, and air smoothly by inserting the porous proton transfer layers containing inorganic fine particles between the polymer electrolyte membrane and the catalyst layers. It can resolve the problem of a low gas transfer rate, which is caused by the coupling of the high-density polymer electrolyte membrane and the catalyst layers, by inducing the formation of a three-phase surface effectively. In addition, since the water generated at the cathode is absorbed by the porous proton transfer layer, it can prevent the pores of the gas diffusion layer from being clogged with water.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A membrane-electrode assembly for a polymer electrolyte membrane fuel cell, comprising:

a polymer electrolyte membrane;

at least one porous proton transfer layer comprising a proton conductive binder and inorganic fine particles having a particle size of between 0.1 μm and 10 μm, the porous proton transfer layer being adjacent at least one side of the polymer electrolyte membrane;

a catalyst layer positioned on the at least one porous proton transfer layer; and a gas diffusion layer positioned on the catalyst layer.

2. The membrane-electrode assembly of claim 1, wherein the at least one porous proton transfer layer has a porosity between 10 and 70%.

3. The membrane-electrode assembly of claim 1, wherein the inorganic fine particles comprise materials selected from the group consisting of non-ion conductive inorganic substances, proton transferring inorganic substances, and combinations thereof.

4. The membrane-electrode assembly of claim 3, wherein the inorganic fine particles comprise a non-ion conductive inorganic substance selected from the group consisting of $SiO_2$, $Al_2O_3$, $TiO_2$, $BaTiO_2$, $Ba_2O_3$, and combinations thereof.

5. The membrane-electrode assembly of claim 3, wherein the inorganic fine particles comprise a proton transferring inorganic substance selected from the group consisting of $ZrO_2$, $ZrP$, $H_3PO_4$, silicotungstic acid, phosphotungstic acid, phosphomolybdic acid, and combinations thereof.

6. The membrane-electrode assembly of claim 1, wherein the polymer electrolyte membrane comprises a polymer selected from the group consisting of fluorine-based polymers, benzimidazol-based polymers, ketone-based polymers, polyether-based polymers, polyester-based polymers, polyamide-based polymers, and polyimide-based polymers.

7. The membrane-electrode assembly of claim 1, wherein the polymer electrolyte membrane comprises a polymer selected from the group consisting of a copolymer of tetrafluoroethylene and fluorovinylether, defluorinated polyetherketone sulfide, arylketone, poly(2,2'-(m-phenylene)-5,5'-bibenzimidazol), and poly(2,5-benzimidazol).

8. The membrane-electrode assembly of claim 1, wherein the catalyst layer comprises a metal catalyst selected from the group consisting of platinum and platinum-ruthenium.

9. The membrane-electrode assembly of claim 1, further comprising a microporous layer between the catalyst layer and the gas diffusion layer.

10. The membrane-electrode assembly of claim 1, further comprising two porous proton transfer layers that contain inorganic fine particles, one on each side of the polymer electrolyte membrane;

a catalyst layer positioned on each of the two porous proton transfer layers; and a gas diffusion layer positioned on each of the catalyst layers.

11. A polymer electrolyte membrane fuel cell system, comprising:

at least one electricity generating unit, a fuel supplying unit for supplying hydrogen to the electricity generating unit, and an oxygen supplying unit for supplying oxygen to the electricity generating unit, wherein the electricity generating unit comprises at least one membrane-electrode assembly, each membrane electrode assembly comprising a polymer electrolyte membrane;

a porous proton transfer layer comprising a proton conductive binder and inorganic fine particles having a particle size of between 0.1 μm and 10 μm on each side of the polymer electrolyte membrane;

a catalyst layer on each porous proton transfer layer; and a gas diffusion layer on each catalyst layer.

12. The fuel cell system of claim 11, wherein each membrane electrode assembly further comprises a microporous layer between each catalyst layer and each gas diffusion layer.

13. The membrane-electrode assembly for a fuel cell of claim 1, wherein the proton conductive binder comprises a polymer selected from the group consisting of poly(perfluorocarboxylic acid), defluorinated polyetherketone sulfide, arylketone, poly(2,2'-(m-phenylene)-5,5'-bibenzimidazol, and poly(2,5-benzimidazol).

14. The fuel cell system of claim 11, wherein the proton conductive binder comprises a polymer selected from the group consisting of poly(perfluorocarboxylic acid), defluorinated polyetherketone sulfide, arylketone, poly(2,2'-(m-phenylene)-5,5'-bibenzimidazol, and poly(2,5-benzimidazol).

* * * * *